United States Patent Office 3,828,012
Patented Aug. 6, 1974

3,828,012
METHOD FOR PREPARING RESINS IN POWDER OR GRANULAR FORM FROM AQUEOUS POLYMER LATICES
Peter Joseph Arndt, Jugenheim, Hans-Dieter Blitz, Darmstadt-Arheilgen, Klaus Huebner, Ober-Ramstadt-Eiche, Wilhelm Krall and Hans-Joachim Kurth, Darmstadt, Manfred Mueller, Rossdorf, and Horst Pennewiss, Darmstadt-Neu-Kranichstein, Germany, assignors to Rohm GmbH, Darmstadt, Germany
No Drawing. Filed Oct. 2, 1972, Ser. No. 294,484
Claims priority, application Germany, Oct. 6, 1971, P 21 49 820.4
Int. Cl. C08f 3/64, 15/18
U.S. Cl. 260—80.73                                  8 Claims

ABSTRACT OF THE DISCLOSURE

Method of preparing powders or granules of a synthetic organic resin by dispersing an aqueous polymer latex containing the resin in an organic liquid substantially immiscible with water and not dissolving the resin, removing water from the dispersion by distillation, and separating the resin from the remaining organic liquid.

---

The invention relates to the preparation of resin powders or granules from aqueous polymer latices containing the resins.

Synthetic resins in the form of powders or granules have various practical uses. Their ability to dissolve relatively rapidly in suitable solvents adapts them to use in the preparation of resin solutions employed as thickening agents, textile finishes, sizes, adhesives, coatings, and the like. Resin powders or granules have the advantage over the finished resin solution that they are not flammable and can be kept in bags or simple wooden drums until shortly before use, thus saving space and weight. In other cases, dry resin powders are intimately mixed with other powdered solids for the production of, for example, powders for coating metal, molding bodies, polyvinyl chloride casting materials with advantageous working properties, raw materials for porous tablet structures, concrete additives, and the like. In the aforementioned cases, the use of a very finely divided resin powder is required for satisfactory results.

Resins in powder or granular form for uses like those mentioned above have heretofore principally been prepared by bulk polymerization with subsequent comminution, or by suspension polymerization. Nevertheless, it is difficult to prepare particles having an average diameter of less than 0.1 mm. in this way. Resin powders having a particle size greater than this value dissolve relatively slowly in solvents and cannot be as intimately admixed with other powdered substances as is desirable in many cases for reasons pertaining to the use of the powders.

Resins having a finer degree of subdivision are obtained if they are prepared as polymer latices by emulsion polymerization. However, it is not possible to recover the particles contained in a latex in the form of a dry fine powder with a coagulating agent, the particles adhere and form a crumbly mass when dried. Freeze-drying does permit the preparation of a powder comprising practically individual particles of the latex, to be sure. However, this process is much too costly for use on a technical scale.

Very finely-divided resin powders are also prepared by the spray drying of polymer latices. In this process, the latex is sprayed through a nozzle into a stream of hot air and the resin is collected in a cyclone separator after complete evaporation of the water. With ordinary spray drying apparatus, a water content of from 2 to 3 percent is attained in the end product. However, it requires considerable effort to reduce the water content to less than 1 percent without using temperatures at which either the resin particles sinter together to form larger aggregates or at which, in the case of heat-hardenable resins, cross-linking sets in. Also, the apparatus must be made larger in size and the amount of air must be increased, which measures mean a larger heating requirement. Also, with an increased air stream, it becomes increasingly difficult to filter out the finest particles, which are not capable of being separated in the cyclone vessel and which amount to 5–10 percent of the resin employed.

The present invention has as an object the conversion of polymer latices to granular aggregates or to very finely divided dry powder, while avoiding the expenditures for energy and apparatus which are required with the known processes.

According to the present invention, this problem has been solved by a process in which an aqueous polymer latex is distributed in an organic liquid which is substantially immiscible (i.e. is not miscible or is only limitedly miscible) with water, which boils at a temperature not above 150° C. at a pressure between 1 mm. Hg and 760 mm. Hg, and which is not a solvent for the dispersed resin. The water is then separated together with some of the organic liquid by distillation, and the resin powder is separated from the remaining organic liquid by conventional techniques.

The process conditions are preferably so chosen that the softening temperature of the resin is not exceeded during the distillation. The softening temperature can be equated in this case with the so-called white point, i.e. that limiting temperature beneath which a layer of the dispersion turns white on drying, without forming a coherent film. In any event, in the present process, the softening point can be somewhat below that value determined for the pure polymer if the organic fluid has a swelling or plasticizing action on the resin. If the softening temperature is lowered more than about 30° C. by these effects, a different organic liquid with a smaller plasticizing action is chosen.

In principle it is also possible to distill off the water at temperatures above the softening temperature of the resin. In this case, the dispersed particles flow together to form granular aggregates which give the product the appearance of a pearl polymer. The individual grains, however, are not completely fused together and have a somewhat porous structure. The individual particles are larger, and more strongly sintered together, the higher the working temperature lies above the softening temperature of the resin. Although by this process no particles are obtained of a size of the order of magnitude of that of particles in a latex, the process nevertheless can offer advantages over a pearl polymerization method. For example, polymers of a very high molecular weight, or particles comprising layers of different polymers, can be prepared in a more simple and more reproducible manner by emulsion polymerization than by suspension polymerization.

The preparation of powdered or granular resins which can be stored at room temperature without aggregation, whether the powder comprises single particles of a dispersed resin or aggregates of a plurality of such particles, requires that the softening temperature, $T_1$, of the resin be above room temperature, e.g. above about 30° C. This requirement is met by polymer latices of polyvinyl chloride or polyvinyl acetate, for example, but, on the other hand, is not filled by latices of polybutadiene and similar latices comprising dienes. Nevertheless, the method of the invention is in principle applicable to any synthetic, organic, polymer latex and latices of these soft resins can also be treated by the method of the invention if measures are taken to maintain low temperatures. Since the latter is costly, the method is preferably applied to resins with a $T_1$ above about 30° C.

The process of the invention is especially used for the preparation of resin powders or granules which completely or predominantly comprise esters of acrylic acid and/or methacrylic acid, or comprise mixtures of these esters with styrene, α-methyl styrene, or vinyl toluene. These resins can be readily prepared by emulsion polymerization and, in powder form, find broad use in a variety of fields. The cost of preparing such resin powders on a technical scale according to known methods, for example by spray drying, is in many cases not justifiable, particularly for special products produced in limited amounts.

Resins comprising acrylic acid esters and methacrylic acid esters have a sufficiently high softening temperature to be used in the process of the invention if methyl acrylate or methacrylic acid esters having 1–4 carbon atoms in the alcohol portion comprise a considerable fraction of the polymer, or if acrylic acid esters or methacrylic acid esters which, if homopolymerized would produce resins with low softening points—such as ethyl-, propyl-, or butyl-acrylate or the acrylic esters or methacrylic acid esters of $C_5$–$C_{12}$ alcohols, are copolymerized with monomers imparting hardness to the resin, such as acrylic acid or methacrylic acid or their salts, acrylonitrile or methacrylonitrile, acrylamide or methacrylamide, styrenes, or vinyl chloride.

Two groups of resins which can be converted to powders according to the process of the invention deserve special mention, namely heat-hardenable resins on the one hand, and water-soluble or alkali-soluble resins on the other hand.

The heat-hardenable resins contain groups capable of cross-linking, the reciprocal reaction of which can be initiated by heating. Among the groups capable of cross-linking, N-methylolamide groups or the ethers or Mannich bases which can be derived therefrom, are of exceptional significance. Groups of this sort are obtained by copolymerization of the monomers mentioned above—which form the principal part of the resin—together with N-methylol-acrylamide or N-methylol methacrylamide, N-methoxymethyl-acrylamide or -methacrylamide, N-butoxymethyl-acrylamide or -methacrylamide, or similar compounds of this type, the last-mentioned monomers being present in amounts of from 2–20 percent by weight of the total monomer mixture. For a catalytic acceleration of the cross-linking, a content of several percent of monomer units containing carboxyl groups can be advantageous. Other groups which are capable of cross-linking, such as glycidyl ester groups or azlactone side groups, which can react with hydroxy, carboxy, or amino groups, are in principle suitable as components imparting heat-hardenability. However, they play a subordinate role in comparison with the aforementioned methylolamides and their derivatives.

The preparation of water-soluble resin powders according to the process of the invention is feasible only if the resin is also water-insoluble in a certain pH region, since the process proceeds using an aqueous latex of the resin. Polymers which comprise a considerable portion of polymerizable carboxylic acids are included in this category. The largest number of carboxy groups which can be tolerated depends in part on the nature of the unsaturated acid involved, and on the molecular weight of the polymer. In the case of methacrylic acid, it can reach 70 or 80 percent.

Polymers of this type are insoluble in the weakly-acid region and are converted by the addition of ammonia or alkali into solutions by way of an intermediate colloidal state. Such colloids or solutions play an important technical role as thickening agents, textile finishing agents, and sizes. The alkali required for the preparation of an aqueous solution, for example sodium hydroxide or sodium carbonate, can be mixed with the dry resin powder. Because of the very small particle size, solution in water or aqueous alkali takes place very quickly.

Resins of this type can contain, as the components containing a carboxy group, units of acrylic acid, methacrylic acid, maleic, fumaric, or itaconic acid. The dicarboxylic acids are in general employed in smaller amounts than are the monocarboxylic acids. If the carboxylic acid content is less than 5 percent by weight, the resins will only be water-soluble if they also contain other hydrophilic comonomers such as acrylamide or methacrylamide, vinyl pyrrolidone, or acrylic acid monoesters or methacrylic acid monoesters of polyvalent alcohols, for example glycol monomethacrylate. At high carboxylic acid contents, the remaining comonomers can be chosen largely to meet technical requirements imposed by the end-use. Water-solubility or alkali-solubility in this case is imparted by the carboxy groups. These groups also impart sufficient hardness to the resin that the resin can be stored at room temperature without danger of clumping even if it comprises a predominant amount of other monomers which, if homopolymerized, would produce soft and sticky homopolymers, such as esters of acrylic acid having more than one carbon atom in the alcohol portion, higher methacrylic acid esters, or vinylidene chloride, for example.

Thus, the process of the present invention is especially useful for the preparation of resin powders or granules from resins (1) which comprise: 50 to 100 percent by weight of esters formed between acrylic acid or methacrylic acid and alcohols having 1 to 12 carbon atoms, or of mixtures of these esters with at most equal amounts by weight of styrene and its homologs such as α-methyl styrene or vinyl toluene; and 0 to 50 percent by weight of other unsaturated monomers which undergo free radical polymerization.

Other preferred resins are (2) resins like those described above under (1) but comprising: 2 to 20 percent by weight of N-methylol-acrylamide or N-methylol-methacrylamide or of N-alkoxymethyl-acrylamide or N-alkoxymethyl-methacrylamide.

Still other preferred resins (3) are those having a softening point, $T_1$, greater than 30° C. and which comprise: 40 to 100 percent by weight of methylacrylate or of esters formed between methacrylic acid and alcohols having 1 to 4 carbon atoms; and/or up to 50 percent by weight of acrylic or methacrylic acid, of the amides or nitriles thereof, or of styrene or its homologs; the balance of such resins may comprise acrylic acid esters of $C_2$–$C_{12}$ alcohols, esters of methacrylic acid with $C_5$–$C_{12}$ alcohols, or mixtures of these esters with up to 20 percent by weight of other unsaturated monomers capable of free radical polymerization.

Finally, latices of alkali-soluble polymers (4) comprising: 30 to 70 percent by weight of water-soluble monomers, of which at least 5 percent are α,β-unsaturated polymerizable carboxylic acids; and 70 to 30 percent of water-insoluble monomers, are advantageously treated according to the invention.

The process of the invention can be practiced not only with uniform resin latices, but also with mixtures of two or more different latices. These latices can differ from each other, for example, in that one latex contains a heat-hardenable resin while the other contains a thermoplastic material, or the resins in the latices can differ in their molecular weight, their solubility properties, or the like.

The resin latices to be employed can be prepared in a known fashion with the use of anionic, cationic, or nonionic emulsifiers. A high solids content, for example 50–60 percent by weight, is advantageous since then the amount of the water to be removed by distillation is smaller. Nevertheless, latices of low concentration, for example with a 20 or 30 percent solids content, can also be employed. Since it is possible to subject the latices to the process of the present invention directly after their preparation, the latices do not have to be stabilized to such a degree that they can be stored for a long period of time nor need they be stabilized against possible freezing. On the other hand, stabilization must of course be sufficient to avoid coagulation when the latex is subjected to the process of the present invention.

The organic liquid in which the polymer latex is distributed must form a two-phase system with water. This does not exclude a limited mutual solubility. The organic liquid, further, must not be a solvent for the dispersed resin. If the liquid exerts a strong swelling action on the resin, undesirable adhesion of the resin particles can occur when water is distilled off. Finally, the liquid should boil at a temperature up to 150° C. at a pressure from 1 mm. Hg–760 mm. Hg. However, it is not practical to use organic liquids of very low boiling point. Their vapor pressure is much higher than that of water and, as a result, the vapor mixture distilled off will contain only small amounts of water vapor. The removal of the water under these circumstances takes a long time, despite high energy input. Liquids which have a normal boiling point below 40° C. are, in general, not practical. If, as is preferred, the process is carried out at atmospheric pressure, the boiling point of the liquid should be below the softening point of the resin, unless the formation of larger aggregates of the resin is not disadvantageous.

A preferred group of organic liquids which fulfill the aforementioned requirements in the majority of cases are the saturated aliphatic straight-chain, branched, or cyclic hydrocarbons such as lower gasoline fractions, n-hexane, n-heptane, n-octane and isooctane, paraffin oil, cyclohexane, Decalin, Tetralin, terpene, and the like. In contrast, aromatic hydrocarbons such as benzene, toluene, or xylene, ethers, or chlorohydrocarbons such as chloroform or carbon tetrachloride, are useful only if the resin is so strongly polar that it is not dissolved by these liquids.

The amount of organic liquid is not critical but it should not be chosen too small since otherwise the three-phase system comprising the resin, water, and the organic liquid has too high a viscosity. The organic liquid is used to advantage in an amount which is 2–10 times the weight of the aqueous polymer latex employed. Within these boundaries, there is an optimum for most systems in which the energy input and the processing time have a minimum value. The smaller the ratio of organic liquid to the aqueous polymer latex, the more finely divided is the resultant resin powder.

In a discontinuous process variation, the latex is mixed with the organic liquid with vigorous stirring and heated to the boiling point. However, it is also possible to add the latex continuously to the boiling organic liquid, for example by spraying it in. The escaping vapors are condensed, the water phase is separated, and the organic liquid is either fed back into the distillation apparatus or collected for the next batch.

Any vessel capable of being heated and provided with a stirring apparatus and distillation column can be used for performing the process. The boiling temperature in most cases lies between 20° C. and 100° C., although it is possible in principle to overstep these limits toward either higher or lower temperatures. In any case, above 100° C. even those resins having the highest softening points begin to adhere, which is why very finely divided powders cannot be prepared in this region.

To operate below 20° C. is only useful in special cases in which products of a very low softening temperature are prepared. If necessary, the operating temperature can be reduced below the freezing point if the process is carried out under a correspondingly low pressure. Naturally, the same low temperatures must then be maintained during separation and storage of the resin.

The finely dispersed condition of the resin generally persists after distillative removal of the water. The addition of particular dispersing agents is not necessary. However, a defoaming agent can be helpful. If, from time to time, there is a tendency of the resin particles to adhere, this tendency can be counteracted by the addition of an emulsifying agent such as the conventional water-in-oil emulsifiers, or inorganic distributing agents such as aluminum hydroxide or magnesium carbonate. Polymers which are soluble or emulsifiable in the organic liquid and which, because of a content of solvophilic and solvophobic groups, have the effect of a protective colloid, or which have the structure of a graft copolymer or block copolymer comprising solvophilic and solvophobic portions, can also be used as emulsifiers. Polymers of the latter type are described, for example, in Belgian Pat. 763,550.

The water introduced as part of the aqueous polymer latex can be removed until only amounts of from 0.1–1 percent, by weight of the resin, remain. From the suspension of resin particles in organic liquid which remains after distillation, the resin can be recovered either by filtration or decantation. The use of a sieve centrifuge is particularly advantageous since it permits a continuous removal of the organic liquid.

If small amounts of organic liquid are still dissolved in the resin particles, they can be driven off in a drying oven, optionally under vacuum, or can be removed by post-drying in a fluidized bed apparatus.

The resin powders prepared according to the present invention are exceptionally suitable for the uses mentioned earlier herein since, because of their small particle size, they are readily soluble and can be uniformly mixed with other solids in powder form. These resin powders can vary in size, on the one hand, from the size of the primary resin particles in the latex employed, e.g. down to 0.2 micron in diameter. On the other hand, it is possible to form granular aggregates of a diameter of 15 mm. using the techniques described earlier herein.

A better understanding of the present invention and of its many advantages will be had by referring to the following specific examples, given by way of illustration.

EXAMPLE 1

40 kilograms of gasoline (b.p.=40° C.–80° C.) are introduced into and brought to boiling in a heatable 100 liter vessel equipped with a wave breaker, an impeller stirrer having a radius of 18 centimeters and rotating with a tip speed of 316 meters/minute, and built-in water separating apparatus. Eight kilograms of a 50 percent aqueous latex of a copolymer comprising 90 parts by weight of methyl methacrylate and ten parts by weight of ethyl acrylate are introduced into the boiling gasoline. At about 52° C., a water/gasoline mixture distills over. The water is separated in a water separator, and the gasoline is reintroduced into the reaction vessel. After removal of about 98 percent of the theoretical amount of water from the cycle, the vessel is cooled with stirring to room temperature and the resin/gasoline suspension is separated in a sieve contrifuge. The resin powder so produced has a residual water content of 0.6 percent. The last residues of gasoline are removed in vacuum or in a drying oven.

The resin powder obtained has a broad distribution of particle sizes. 30 percent by weight has a particle size less than 0.05 mm., and 50 percent by weight has a particle size between 0.05 and 0.15 mm.

EXAMPLE 2

1500 g. of gasoline (b.p.=80° C.–110° C.) are introduced into and brought to boiling in a heated four-liter four necked round flask provided with a wing stirrer having a radius of 2.75 centimeters and a tip speed of 225 meters/minute, a thermometer, and a water separator. 150 g. of a 50 percent aqueous polyvinyl acetate latex are introduced into the boiling gasoline. At a temperature of about 77° C., a mixture of gasoline and water is distilled off. The distillate is separated in a water separator and the gasoline is re-introduced into the distillation flask. After separation of about 98 percent of the theoretical amount of water, the arrangement is cooled to room temperature with stirring and the resin mixture is filtered off using a suction filter. The resin pearls obtained in this manner have a residual water content of 1.2 percent. The pearl diameter is in the range from 0.4–2 mm., with the average pearl diameter being from 1.0–1.5 mm.

EXAMPLE 3

1500 g. of gasoline (b.p.=40° C.–80° C.) are introduced into the apparatus described in Example 2 and heated. 150 g. of a 40 percent aqueous latex of a copolymer comprising 30 parts by weight of methyl methacrylate, 30 parts by weight of methacrylic acid, and 40 parts by weight of ethyl acrylate are introduced into the boiling gasoline. A water/gasoline mixture distills off at a boiling temperature of about 52° C. The distillate is separated in a water separator and the gasoline is returned to the distillation flask. After the separation of about 98 percent of the theoretical amount of water, the arrangement is cooled to room temperature and the gasoline/resin mixture is filtered with a suction filter. The water content of the resin powder obtained is 2.5 percent. The particle size of the powder is rather uniform; about 70 percent by weight comprises particles having a diameter from 0.6–1.5 mm.

EXAMPLE 4

40 kg. of gasoline (b.p.=140° C.–200° C.) are introduced into an apparatus as described in Example 1 and heated to about 110°–120° C. 8 kg. of a 50 percent aqueous latex of a copolymer comprising 45 parts by weight of methyl methacrylate and 55 parts of ethyl acrylate are added. At about 96° C., a water/gasoline mixture is distilled off. The distillate is separated in a water separator and the gasoline is re-introduced into the distillation cycle. As soon as about 98 percent of the theoretical amount of water is separated, the whole is cooled with stirring and the resin/gasoline mixture is separated in a sieve centrifuge. The resin pearls obtained contain only 0.4 percent of water and comprise polymer particles sintered together. More than 50 percent by weight of the particles have a diameter between 0.6 and 2.0 mm.; the rest are larger.

EXAMPLE 5

As in Example 1, 40 kg. of gasoline (b.p.=140° C.–200° C.) are heated to 110° C.–120° C. and 16 kg. of a 25 percent aqueous latex of a copolymer comprising 90 parts by weight of methyl methacrylate and 10 parts by weight of ethyl acrylate are added. In addition, 0.042 kg. of a copolymer of methacrylic acid and styrene neutralized with sodium hydroxide (commercially available as "Rohagit S 3," Roehm GmbH, Germany) were added as an auxiliary dispersing agent. At a boiling temperature of 97° C., a gasoline/water mixture distills over and is treated as in Example 1.

The precipitating resin particles contain about 0.57 percent of water. The average particle size is from 1.5–2.5 mm. in diameter. The particle size distribution is, in comparison with Example 4 in which no auxiliary dispersant was added, considerably narrower. The fraction of large particles (of a diameter greater than 3.0 mm.) is significantly smaller.

EXAMPLE 6

1.5 kg. of gasoline (b.p.=40° C.–80° C.) are brought to boiling in an apparatus like that of Example 2 and 0.150 kg. of a self-cross-linking emulsion copolymer comprising 95 parts by weight of methyl methacrylate and 5 parts by weight of N-methylol methacrylamide are introduced into the boiling benzene in the form of a 40 percent aqueous latex. A gasoline/water mixture is distilled off at about 42° C. The distillate is separated in a water separator and the gasoline is returned to the distillation flask. After separation of 98 percent of the theoretical amount of water, the apparatus is cooled to room temperature and the resin/gasoline mixture is filtered in a suction filter. The resin powder contains 1.8 percent of residual water and has an average particle size of 0.1–0.2 mm. with a very narrow particle size distribution.

EXAMPLE 7

1500 g. of gasoline (b.p.=140° C.–200° C.) are introduced into an apparatus like that of Example 2 and heated to 110° C.–120° C. 150 grams of a 40 percent aqueous latex comprising a copolymer of 37.5 parts by weight of methyl methacrylate, 15 parts by weight of n-butyl acrylate, 3.75 parts by weight of acrylonitrile, and 10 parts by weight of methacrylic acid are added. A water/gasoline mixture is distilled off at 97° C. and separated in a water separator. The gasoline is returned to the distillation flask. After separation of about 98 percent of the theoretical amount of water, the batch is cooled to room temperature with stirring and the gasoline/resin mixture is suction-filtered. The water content of the resin particles obtained is about 2.0 percent. The size of the particles is predominantly between 0.6 and 1.5 mm.

What is claimed is:

1. The method of preparing a synthetic organic resin in powder or granular form, said resin having a softening point above about 30° C., which method comprises dispersing an aqueous latex of said resin in an organic liquid, removing water from the dispersion by distillation together with some of said organic liquid, and then separating the resin from the suspension of resin in the remaining organic liquid, said organic liquid being substantially immiscible with water, having a boiling point below 150° C. at a pressure between 1 mm. Hg and 760 mm. Hg and a normal boiling point above 40° C., being a non-solvent for said resin, and being selected from the group consisting of saturated aliphatic straight-chain, branched, and cyclic hydrocarbons, aromatic hydrocarbons, ethers, and chlorohydrocarbons.

2. The method as in Claim 1 wherein said organic liquid is a saturated aliphatic straight-chain, branched, or cyclic hydrocarbon, or a mixture thereof.

3. The method as in Claim 1 wherein the water is distilled at a temperature below the softening temperature of the resin.

4. The method of Claim 1 wherein the water is distilled in the presence of a dispersing agent present in said dispersion.

5. The method as in Claim 1 wherein said synthetic organic resin comprises 50 to 100 percent by weight of an ester of acrylic acid, an ester of methacrylic acid, or mixtures of such esters with each other or with styrene, α-methyl styrene, or vinyl toluene.

6. The method as in Claim 5 wherein said synthetic organic resin comprises, copolymerized with said esters or mixtures, other ethylenically unsaturated monomers having groups outside the polymer backbone which are reciprocally reactive on heating to effect cross-linking.

7. The method as in Claim 6 wherein said cross-linking groups are methylolamide or alkoxyamide groups.

8. The method as in Claim 1 wherein said synthetic organic resin comprises up to 80 percent by weight of at least one polymerizable carboxylic acid.

References Cited

UNITED STATES PATENTS

| | | | |
|---|---|---|---|
| 2,194,354 | 3/1940 | Crawford et al. | 260—89.1 |
| 2,270,182 | 1/1942 | Collings et al. | 260—93.5 A |
| 2,800,463 | 7/1957 | Morrison | 260—89.1 |
| 3,432,483 | 3/1969 | Peoples et al. | 260—89.1 |
| 3,684,783 | 8/1972 | Lauck | 260—93.5 A |

HARRY WONG, JR., Primary Examiner

U.S. Cl. X.R.

117—161; 260—29.6 R, 33.2 R, 33.6 UA, 33.8 UA, 78.5 T, 80.8, 80.81, 85.5 S, 86.1 R, 86.1 N, 86.1 E, 86.3, 86.7, 89.5 S

UNITED STATES PATENT OFFICE
CERTIFICATE OF CORRECTION

Patent No. 3,828,012          Dated August 6, 1974

Inventor(s) Peter Joseph Arndt et al.

It is certified that error appears in the above-identified patent and that said Letters Patent are hereby corrected as shown below:

In the Heading: Line 4 after the title, delete "and" after "Rossdorf," and before "Horst Pennewiss";

Line 5 after the title, after "Kranichstein," and before "Germany" insert -- and Norbert Suetterlin, Griesheim, --.

Signed and sealed this 26th day of November 1974.

(SEAL)
Attest:

McCOY M. GIBSON JR.          C. MARSHALL DANN
Attesting Officer          Commissioner of Patents